United States Patent

Handa et al.

[11] Patent Number: 5,935,684
[45] Date of Patent: Aug. 10, 1999

[54] LAMINATE FILM

[75] Inventors: Makoto Handa; Toshifumi Osawa; Mitsuo Tojo, all of Sagamihara, Japan

[73] Assignee: Teijin Limited, Osaka, Japan

[21] Appl. No.: 08/903,692

[22] Filed: Jul. 31, 1997

[30] Foreign Application Priority Data

Jul. 31, 1996 [JP] Japan ................................. 8-201746

[51] Int. Cl.$^6$ .................................................. G11B 5/704
[52] U.S. Cl. ........................ 428/141; 428/212; 428/323; 428/332; 428/694 SL; 428/694 BS; 428/694 BB; 428/694 SG; 428/900
[58] Field of Search .................................. 428/141, 212, 428/323, 332, 694 SL, 694 BS, 694 BB, 694 SG, 900

[56] References Cited

U.S. PATENT DOCUMENTS 4,305,995  12/1981  Ota et al. ............................. 428/423.1

FOREIGN PATENT DOCUMENTS

| 0579121A2 | 1/1994  | European Pat. Off. . |
| 0822220A2 | 2/1998  | European Pat. Off. . |
| 52-134706 | 11/1977 | Japan . |
| 54-147010 | 11/1979 | Japan . |
| 5194772   | 8/1993  | Japan . |
| 5298670   | 11/1993 | Japan . |
| 2054609   | 2/1981  | United Kingdom . |

OTHER PUBLICATIONS

Patent Abstracts of Japan, vol. 096, No. 003, Mar. 29, 1996 & JP 07 304890 A, Nov. 21, 1995.
Patent Abstracts of Japan, vol. 096, No. 009, Sep. 30, 1996 & JP 08 134245 A, May 28, 1996.
Patent Abstracts of Japan, vol. 018, No. 366 (M–1636), Jul. 11, 1994 & JP 06 099559 A, Apr. 12, 1994.

Primary Examiner—Stevan A. Resan
Attorney, Agent, or Firm—Sughrue, Mion, Zinn, Macpeak & Seas, PLLC

[57] ABSTRACT

A laminate film comprises a base layer A formed of a thermoplastic resin A and a coating film layer B present on one surface of the base layer A. The coating film layer B contains a binder resin, inert fine particles and a surfactant. The surfactant consists essentially of 0.1 to 15% by weight of a surfactant X having an HLB value of 10 to 14 and 10 to 40% by weight of a surfactant Y having an HLB value of 16 to 18.5 based on the solid content of the coating film layer B to ensure that the average HLB value defined by the following equation be 15 to 18:

$$\text{average } HLB = HLB(X) \times P(X) + HLB(Y) \times P(Y)$$

wherein $HLB(X)$ is an HLB value of the surfactant X, $P(X)$ is a weight fraction of the surfactant X with respect to the total weight of the surfactants X and Y, $HLB(Y)$ is an HLB value of the surfactant Y, and $P(Y)$ is a weight fraction of the surfactant Y with respect to the total weight of the surfactants X and Y.

The laminate film is useful as a base for a magnet recording medium.

23 Claims, No Drawings

LAMINATE FILM

DETAILED DESCRIPTION OF THE INVENTION

This invention relates to a laminate film and, more specifically, to a laminate film which is useful as a base film for a magnetic recording medium having excellent running durability and electromagnetic conversion characteristics and almost free from drop-outs.

In recent years, remarkable progress has been made in high-density magnetic recording, as exemplified by the development and implementation of a thin metal film magnetic recording medium in which a thin ferromagnetic metal film is formed on a non-magnetic base film by a physical deposition method such as vacuum vapor deposition or sputtering or a plating method and a thin layer coated magnetic recording medium in which a needle-shaped magnetic powder such as a metal powder or iron oxide powder is coated to a thickness of not larger 2 µm.

As known examples of the former, JP-A 54-147010 (the term "JP-A" as used herein means an "unexamined published Japanese patent application") discloses a magnetic recording medium comprising a first thin Co-film magnetic layer formed on a base film composed of a non-magnetic material and a second thin Co-film magnetic layer having a larger thickness than the first thin Co-film magnetic layer, the second thin Co-film magnetic layer being formed on the first thin Co-film magnetic layer via a non-magnetic material layer; and JP-A 52-134706 discloses a vertical magnetic recording medium using a Co—Cr alloy.

As a known example of the latter, "Technical Report MR 94-78" (1995-02) issued by the Institute of Electronics and Communication Engineers of Japan discloses an extremely thin layer coated medium for high-density magnetic recording.

Since a coated magnetic recording medium of the prior art, i.e., a magnetic recording medium, in which a mixture of magnetic powders and an organic polymer binder is coated on a non-magnetic base film, has a low recording density and a long recording wavelength, the thickness of its magnetic layer is as large as about 2 µm or more. On the other hand, a thin ferromagnetic metal film formed by thin film forming means such as vacuum vapor deposition, sputtering or ion plating has a thickness as extremely small as 0.2 µm or less. In the case of an extremely thin layer coated medium, too, there is proposed a coated magnetic layer having an extremely thin thickness of 0.13 µm, though a non-magnetic underlying layer is provided.

In the above high-density magnetic recording medium, therefore, the surface condition of the non-magnetic substrate (base film) has a great influence on the surface characteristics of the magnetic recording layer. Particularly, in the case of a thin metal film magnetic recording medium, the surface roughness of the non-magnetic base film influences directly to the surface of a magnetic layer (magnetic recording layer).

Further, in the case of a thin metal film magnetic recording medium, a serious problem encountered at the time when it is actually used is the running property of a thin metal film surface. In the case of a coated magnetic recording medium in which magnetic powders are mixed into an organic polymer binder and the resulting mixture is coated onto the base film, a lubricant can be dispersed in the binder to improve the running property of the magnetic layer surface. However, in the case of the thin metal film magnetic recording medium, this measure cannot be taken, and it is extremely difficult to maintain a stable running property. Particularly, the medium possesses a drawback in running property at a high temperature and high humidity. Moreover, in this case, compared with the coated magnetic recording medium, it has a great reduction in output when it is used repeatedly.

On the other hand, from viewpoints of the formation of a non-magnetic base film and handling properties such as transportation, scratching, wind-up and wind-off in the process of film formation, the film having a too smooth surface is not desirable because slipperiness between films deteriorates, a blocking phenomenon occurs, roll formation of the base film becomes worse, and in consequence, the yield of products gets lower, thereby inducing an increase in production costs. Therefore, from a viewpoint of production costs, it is desirable that the surface of the non-magnetic base film be as rough as possible.

In this way, the surface of the non-magnetic base film is required to be smooth from a viewpoint of electromagnetic conversion characteristics, whereas it is required to be rough from a viewpoint of handling properties and film production costs.

To produce a high-quality high-density magnetic recording medium, it is necessary to fulfill the above contradictory requirements at the same time.

JP-A 5-194772 discloses a polyester film for a magnetic recording medium in which a continuous thin film primer layer for a magnetic layer is formed on one surface of the polyester film, the surface of the continuous thin film of the primer layer has (A) small protrusions containing, as a nucleus, particles with an average particle diameter of less than 0.06 µm and having a height of not more than 13 nm, (B) large protrusions containing, as a nucleus, particles with an average particle diameter of not less than 0.06 µm and having a height of not more than 30 nm, and (C) microprotrusions composed only of a resin forming the primer layer, the numbers of these protrusions fulfill the following relations:

$AN \geq 1.0 \times 10^6$ (per mm$^2$)

$BN \geq 1.05 \times 10^4$ (per mm$^2$)

$AN \leq -3.4 \times 10^2 \cdot BN + 13.6 \times 10^6$ (per mm$^2$)

$CN \leq 4.0 \times 10^6$ (per mm$^2$)

wherein AN is a number of small protrusions per mm$^2$, BN is a number of large protrusions per mm$^2$, and CN is a number of microprotrusions per mm$^2$, the surface roughness Ra$^s$ in a micro area of the primer layer, without small and large protrusions included in it, and formed only of a primer resin is not more than 1.10 nm, and the surface roughness Ra of the continuous thin film is 1 to 10 nm.

JP-A 5-298670 teaches a polyester film for a magnetic recording medium in which a continuous thin film primer layer for a magnetic layer is formed on one surface of the polyester film, the surface of the continuous thin film of the primer layer has (A) small protrusions containing, as a nucleus, particles with an average particle diameter of less than 0.06 µm and having a height of not more than 13 nm, (B) large protrusions containing, as a nucleus, particles with an average particles diameter of not less than 0.06 µm and having a height of not more than 30 nm, and (C) microprotrusions composed only of a resin forming the primer layer and having the longest diameter of not more than 0.30 µm, the numbers of these protrusions fulfill the following relations:

$AN \geq 1.0 \times 10^6$ (per mm²)

$BN \geq 1.05 \times 10^4$ (per mm²)

$AN \leq -3.4 \times 10^2 \cdot BN + 13.6 \times 10^6$ (per mm²)

$1.0 \times 10$ (per mm²) $\leq CN \leq 1.0 \times 10^4$ (per mm²)

wherein AN is a number of small protrusions per mm², BN is a number of large protrusions per mm², and CN is a number of microprotrusions per mm²,
the surface roughness Ra$^s$ in a micro area of the primer layer, without small and large protrusions included in it, and formed only of a primer resin is not more than 1.10 nm, the surface roughness Ra of the continuous thin film is 1 to 10 nm, and the continuous thin film is a film by which the deposition rate of polyester oligomer microcrystals on the continuous film surface can be controlled to not more than 0.8% when the film is continuously heated in air at 160° C. for 5 minutes.

In the above polyester films, the base film surface on the side of the magnetic layer can be made smooth to a certain degree, but such a problem that drop-outs are caused by the presence of high peaks due to agglomerated particles in the coating film layer cannot be solved.

In the above methods, particles are contained in the base film on the side of the magnetic layer to improve running durability. However, due to the lack of good dispersion of particles, there are generated many high peaks owing to agglomerated particles, which cause drop-outs and the output reduction due to the partial abrasion of the magnetic head.

It is an object of the present invention to provide a laminate film which is useful as a base film for a magnetic recording medium.

It is another object of the present invention to provide a laminate film for a magnetic recording medium having excellent running durability and electromagnetic conversion characteristics and almost free from drop-outs by greatly reducing the number of high peaks which are formed due to a coating solution for forming a coating film layer.

Other objects and advantages of the present invention will become more apparent from the following description.

According to the present invention, the above objects and advantages of the present invention can be attained by a laminate film which comprises a base layer A formed of a thermoplastic resin A and a coating film layer B present on one surface of the base layer A, the coating film layer B containing a binder resin, inert fine particles and a surfactant, and said surfactant consisting essentially of 0.1 to 15% by weight of a surfactant X having an HLB value of 10 to 14 and 10 to 40% by weight of a surfactant Y having an HLB value of 16 to 18.5 based on the solid content of the coating film layer B to ensure that the average HLB value defined by the following equation be 15 to 18 average $HLB = HLB(X) \times P(X) + HLB(Y) \times P(Y)$ wherein HLB(X) is an HLB value of the surfactant X, P(X) is a weight fraction of the surfactant X with respect to the total weight of the surfactants X and Y, HLB(Y) is an HLB value of the surfactant Y, and P(Y) is a weight fraction of the surfactant Y with respect to the total weight of the surfactants X and Y.

The laminate film of the present invention comprises a base layer A formed of a thermoplastic resin A and a coating film layer B present on one surface of the base layer A, as described above.

The thermoplastic resin constituting the base layer A is, for example, a polyester resin, polyamide resin, polyimide resin, polyether resin, polycarbonate resin, polyvinyl resin, polyolefin resin or the like. Of these, the thermoplastic resin is preferably a polyester resin, more preferably an aromatic polyester.

Preferred examples of the aromatic polyester include polyethylene terephthalate, polyethylene isophthalate, poly-tetramethylene terephthalate, poly-1,4-cyclohexylene dimethylene terephthalate, polyethylene-2,6-naphthalene dicarboxylate and the like. Of these, polyethylene terephthalate and polyethylene-2,6-naphthalene dicarboxylate are particularly preferred.

These polyesters may be either a homopolyester or copolyester. In the case of a copolyester, examples of the copolymerizable component of polyethylene terephthalate and polyethylene-2,6-naphthalene dicarboxylate include other diol components such as diethylene glycol, propylene glycol, tetramethylene glycol, hexamethylene glycol, neopentyl glycol, polyethylene glycol, p-xylene glycol, 1,4-cyclohexane dimethanol and the like; other dicarboxylic acid components such as adipic acid, sebacic acid, phthalic acid, isophthalic acid, terephthalic acid (in the case of polyethylene-2,6-naphthalene dicarboxylate), 2,6-naphthalenedicarboxylic acid (in the case of polyethylene terephthalate), 5-sodium sulfoisophthalic acid and the like; an oxycarboxylic acid component such as p-oxyethoxybenzoic acid; or the like. The amount of the copolymerizable component is preferably not more than 20 mol %, more preferably not more than 10 mol %.

Further, a polyfunctional compound having 3 or more functional groups, such as trimellitic acid or pyromellitic acid, may be copolymerized. In this case, the polyfunctional compound may be copolymerized in such an amount that the polymer is substantially linear, for example, in an amount of not more than 2 mol %.

It should be understood that the same definition and exemplification as above can apply to the copolymerizable components of polyesters other than polyethylene terephthalate and polyethylene-2,6-naphthalene dicarboxylate.

The above polyesters are well known per se and can be produced by known methods per se.

The thermoplastic resin A forming the base layer A may contain or may not contain inert particles.

When the thermoplastic resin A contains inert particles, the inert particles preferably have an average particle diameter of 40 to 400 nm and a volume shape factor of 0.1 to π/6. The average particle diameter is more preferably 50 to 200 nm, particularly preferably 60 to 120 nm. The volume shape factor is more preferably 0.4 to π/6.

Further, the thermoplastic resin A preferably contains the inert fine particles A in such an amount that protrusions due to the inert fine particles A contained in the thermoplastic resin A are produced on the surface not in contact with the coating film layer B of the base layer A at a density of 5,000 to 100,000 per mm². The density of the protrusions is preferably 7,500 to 60,000 per mm², more preferably 10,000 to 30,000 per mm².

When the average particle diameter is less than 40 nm or the density of protrusions is less than 5,000 per mm², satisfactory running durability cannot be obtained, while when the average particle diameter is more than 400 nm or the density of protrusions is more than 100,000 per mm², electromagnetic conversion characteristics deteriorate disadvantageously.

The volume shape factor of the particle is defined by the following equation (2).

$$f = V/R^3 \qquad (2)$$

wherein f is a volume shape factor, V is a volume ($\mu m^3$) of the particle and R is an average particle diameter ($\mu m$) of the particles.

When the factor (f) is $\pi/6$, the particle has a sphere, and when the factor (f) is 0.4 to $\pi/6$, the particle is substantially a sphere or elliptical sphere like a rugby ball. When the particle has a volume shape factor (f) of less than 0.1, or for example, it is a flake-like shaped particle, it is difficult to obtain sufficient running durability.

The laminate film of the present invention has a coating film layer B containing a binder resin, inert fine particles and a surfactant on one surface of the base layer A.

The binder resin is preferably a hydrophilic polyester resin, hydrophilic acrylic resin, hydrophilic polyurethane resin or the like, and the hydrophilic polyester resin is particularly preferred.

The hydrophilic polyester resin is preferably a polyester resin mainly containing, as an acid component, at least one polyvalent carboxylic acid such as isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, monopotassium salt of trimellitic acid or p-hydroxybenzoic acid and as a glycol component at least one polyvalent hydroxy compound such as ethylene glycol, diethylene glycol, propylene glycol, 1,4-butane diol, 1,6-hexane diol, 1,4-cyclohexane dimethanol, p-xylylene glycol, dimethylolpropionic acid or addition product of bisphenol A with ethylene oxide. Graft polymers and block copolymers in which an acryl polymer chain is bonded to a polyester chain, and acryl modified polyester resins in which two different polymers form a specific physical structure (IPN, core shell) in the macromolecule may also be used. The hydrophilic polyester resin may be of a water-soluble, emulsifiable or finely dispersible type, of which water emulsifiable and finely dispersible types are preferred. To provide the above hydrophilic polyester resin with hydrophilic nature, for example, sulfonate group, carboxylate group or polyether unit may be introduced into the molecule of the hydrophilic polyester resin.

Although the inert fine particles are not limited to a particular kind, they are preferably ones that are hard to precipitate in a coating solution and have a relatively low specific gravity. Preferred examples of such inert fine particles include particles formed of heat resistant polymers (such as crosslinked silicone resins, crosslinked acrylic resins, crosslinked polystyrene, crosslinked polystyrene, melamine-formaldehyde resin, aromatic polyamide resins, polyamide imide resins, crosslinked polyesters, totally aromatic polyesters and the like), silicon dioxide (silica), calcium carbonate and the like. Of these, crosslinked silicone resin particles, silica and core-shell type organic particles (such as particles consisting of crosslinked polystyrene as a core and polymethylmethacrylate as a shell) are particularly preferred.

These inert fine particles preferably have an average particle diameter of 10 to 50 nm. The average particle diameter is more preferably 15 to 45 nm, particularly preferably 18 to 40 nm.

The inert fine particles are preferably contained in an amount of 0.5 to 30% by weight, more preferably 2 to 20% by weight, based on the solid content of the coating film layer B.

On the surface not in contact with the base layer A of the coating film layer B, protrusions due to the inert fine particles contained in the coating film layer B are preferably present at a density of 1 to 40 per $\mu m^2$, more preferably 2 to 20 per $\mu m^2$, particularly preferably 2.5 to 18 per $\mu m^2$, the most preferably 3 to 15 per $\mu m^2$.

On the surface not in contact with the base layer A of the coating film layer B, high peaks having a height, calculated from a surface roughness profile obtained by a non-contact 3-D roughness meter, of not less than 4 nm are present at a density of 200 per $mm^2$, preferably 100 per $mm^2$, at the maximum.

Owing to the presence of the above protrusions, excellent running durability can be obtained.

As the surfactant, combination of two surfactants having different HLB values is used. One surfactant X has an HLB value of 10 to 14 and the other surfactant Y has an HLB value of 16 to 18.5.

The HLB value of the surfactant X is preferably 10.5 to 13.5, more preferably 11.0 to 13.0.

The HLB value of the surfactant Y is preferably 16.5 to 18.3, more preferably 17.0 to 18.0.

The above surfactant X is contained in an amount of 0.1 to 15% by weight, preferably 0.65 to 10% by weight, particularly preferably 0.85 to 5% by weight, based on the solid content of a coating solution. The above surfactant Y is contained in an amount of 10 to 40% by weight, preferably 12 to 36% by weight, particularly preferably 15 to 30% by weight, based on the solid content of a coating solution.

The surfactant X and the surfactant Y are used in the above weight proportions to ensure that the average HLB value defined by the following equation should be 15 to 18.

$$\text{average } HLB \text{ value} = HLB(X) \times P(X) + HLB(Y) \times P(Y)$$

wherein HLB(X) is an HLB value of the surfactant X, P(X) is a weight fraction of the surfactant X with respect to the total weight of the surfactants X and Y, HLB(Y) is an HLB value of the surfactant Y, and P(Y) is a weight fraction of the surfactant Y with respect to the total weight of the surfactants X and Y.

The average HLB value is preferably 15.5 to 17.5, more preferably 16 to 17.5.

If the HLB value of the surfactant X is less than 10 or the amount thereof is more than 15% by weight (based on the total solid content), foaming will be liable to occur when a coating solution is applied, resulting in the formation of a stripe-shaped coating defect. On the other hand, if the HLB value of the surfactant X is more than 14 or the amount thereof is less than 0.1% by weight (based on the total solid content), a coating failure will occur when the coating solution is applied because the function of reducing the surface tension of the coating solution becomes insufficient.

If the HLB value of the surfactant Y is less than 16 or the amount thereof is less than 10% by weight (based on the total solid content), the formation of high peaks which may cause drop-out cannot be suppressed. On the other hand, if the HLB value of the surfactant Y is more than 18.5, a coating failure will occur and if the amount thereof is more than 40% by weight (based on the total solid content), a stripe-shaped coating defect will occur due to foaming.

Further, if the average HLB value of the surfactants is less than 15, high peaks which may cause drop-out will be produced and if the average HLB value is more than 18, a coating failure will occur.

Moreover, when only either one of the surfactants X and Y is used, it is impossible to solve such coating problems as a coating failure caused by repellency and a foaming stripe and to suppress the generation of high peaks due to agglomeration of particles at the same time.

The surfactants are preferably nonionic surfactants, particularly preferably surfactants in which (poly)ethylene oxide is added or bonded to alkyl alcohol, alkyl phenyl alcohol, higher fatty acid or the like.

Illustrative examples of the surfactant X include polyoxyethylene alkyl phenylether compounds such as Nonion NS-208.5 (HLB 12.6), NS-206 (HLB 10.9), HS-208 (HLB 12.6) and HS-210 (HLB 13.6) of NOF Corporation, and Octapole 60 (HLB 11.3), Octapole 80 (HLB 12.4), Octapole 95 (HLB 13.3), Octapole 100 (HLB 13.6), Dodecapole 90 (HLB 12.0) and Dodecapole 120 (HLB 13.4) of Sanyo Chemical Industries, Ltd.; polyoxyethylene alkyl etherbased compounds such as Nonion P-210 (HLB 12.9) of NOF Corporation, and Nonipole Soft SS-50 (HLB 10.5), SS-70 (HLB 12.8), SS-90 (HLB 13.2), DO-70 (HLB 12.3) and DO-90 (HLB 13.4) of Sanyo Chemical Industries, Ltd.; polyoxyethylene higher fatty acid ester compounds such as Nonion L-4 (HLB 13.1) and S-4 (HLB 11.6) of NOF Corporation; and the like. Illustrative examples of the surfactant Y include polyoxyethylene alkyl phenyl ether compounds such as Nonion NS-230 (HLB 17.2), NS-240 (HLB 17.8), HS-220 (HLB 16.2) and HS-240 (HLB 17.9) of NOF Corporation, and Nonipole 200 (HLB 16.0), Nonipole 400 (HLB 17.8), Nonipole 500 (HLB 18.2) and Octapole 400 (HLB 17.9) of Sanyo Chemical Industries, Ltd.; polyoxyethylene alkyl ether compounds such as Nonion E-230 (HLB 16.6), K-220 (HLB 16.2) and K-230 (HLB 17.3) of NOF Corporation; polyoxyethylene higher fatty acid ester compounds such as Nonion S-15.4 (HLB 16.7) and S-40 (HLB 18.2) of NOF Corporation; and the like.

The laminate film of the present invention has high peaks having a height, calculated from a surface roughness profile obtained by a non-contact 3-D roughness meter, of not less than 4 nm on the surface of the coating film layer B, which is not in contact with the base layer A, preferably at a density of 200 per mm$^2$ at the maximum.

If the number of high peaks is more than 200 per mm$^2$, they themselves will cause drop-out. When drop-outs are caused by insufficient dispersion of the inert particles A, the partial abrasion of the magnetic head is liable to occur to deteriorate electromagnetic conversion characteristics disadvantageously.

To improve the dispersibility of the inert fine particles A in the thermoplastic resin layer A, when a polyester is used as the thermoplastic resin A, it is preferred to optimize the time of adding the inert fine particles as a glycol slurry during the polymerization of the polyester or the speed of adding the glycol slurry, or to carry out high-precision filtration before the molten polymer is extruded from an extrusion die at the time of film manufacturing. In this high-precision filtration, the average mesh opening of a filter, particularly a metal fiber sintered filter, is preferably 50 times or more, more preferably 80 times or more the average particle diameter of the inert particles A. It is particularly preferred to optimize the addition of the particles as well as the average mesh opening of a filter for high-precision filtration.

The laminate film of the present invention has a thin film layer C on the other surface, which is not in contact with the coating film layer B, of the base layer A.

The thin film layer C preferably contains inert fine particles. The thin film layer C can be a coating film layer or a thermoplastic resin layer formed by coextrusion.

The coating film as the thin film layer C can comprise a binder resin and inert fine particles C and can further contain a surfactant. The same binder resins and surfactants as those listed for the coating film layer B can be used. The inert fine particles C used have preferably an average particle diameter of 0.01 to 0.1 $\mu$m, more preferably 0.02 to 0.08 $\mu$m, particularly preferably 0.02 to 0.06 $\mu$m, and they are used preferably in an amount of 0.5 to 30% by weight, more preferably 1 to 20% by weight, particularly preferably 2 to 10% by weight. In this case, each of the surfactants X and Y can be used alone or in combination as the surfactant. Therefore, the thin film layer C may have the same composition as the coating film layer B.

Further, the thin film layer C may be a thermoplastic resin layer containing inert fine particles C and formed by coextrusion with the base layer A.

The thickness of the thin film layer C and the average particle diameter of the inert fine particles C preferably fulfill the following relation.

$$0.001 \leq (dc)^3 \times Cc \times tc \leq 100$$

wherein dc ($\mu$m) is an average particle diameter of the inert fine particles C, Cc (% by weight) is a content of the inert fine particles C and tc (nm) is a thickness of the thin film layer C.

The above relation between the thickness of the inert fine particles C and the average particle diameter of the inert fine particles C is preferably $$0.001 \leq (dc)^3 \times Cc \times tc \leq 0.1$$

when it is a coating film layer, while the above relation is $$0.1 \leq (dc)^3 \times Cc \times tc \leq 100$$

when it is a coextrusion layer.

When the thin film layer C is a coextrusion layer and the layer contains only one type of inert fine particles, the average particle diameter and the content of them are as follows.

The average particle diameter dc of the inert fine particles is 0.1 to 1 $\mu$m, preferably 0.15 to 0.8 $\mu$m, particularly preferably 0.2 to 0.7 $\mu$m. The content of the inert fine particles C having this average particle diameter dc is 0.0001 to 1% by weight, preferably 0.001 to 0.5% by weight, particularly preferably 0.005 to 0.1% by weight, based on the thin film layer C.

Preferred examples of the inert particles having this average particle diameter dc include (1) heat resistant polymer particles (such as particles of crosslinked silicone resins, crosslinked polystyrene, crosslinked acrylic resins, melamine-formaldehyde resins, aromatic polyamide resins, polyimide resins, polyamide imide resins and crosslinked polyesters), (2) metal oxides (such as aluminum sesquioxide, titanium dioxide, silicon dioxide, magnesium oxide, zinc oxide and zirconium oxide), (3) metal carbonates (such as magnesium carbonate and calcium carbonate), (4) metal sulfates (such as calcium sulfate and barium sulfate), (5) carbon (such as carbon black, graphite and diamond), and (6) clay minerals (such as kaolin, clay and bentonite). Of these, crosslinked silicone resin particles, crosslinked polystyrene particles, melamine-formaldehyde resin particles, polyamide imide resin particles, aluminum sesquioxide (alumina), titanium dioxide, silicon dioxide, zirconium oxide, synthetic calcium carbonate, barium sulfate, diamond and kaolin are more preferred. Crosslinked silicone resin particles, crosslinked styrene particles, alumina, titanium dioxide, silicon dioxide and synthetic calcium carbonate are particularly preferred.

Further, when the inert fine particles consist of two or more different types of particles, such fine particles as colloidal silica or alumina having α, γ, δ or θ crystal form are preferably used as second or third particles having a smaller average particle diameter than the average particle diameter dc of the inert fine particles C. Of particles exemplified as the inert fine particles having an average particle diameter dc, fine particles having a small average particle diameter may also be used.

The average particle diameter of the fine particles is 5 to 400 nm, preferably 10 to 300 nm, particularly preferably 30 to 250 nm and is smaller than the above average particle diameter dc by 50 nm or more, preferably 100 nm or more, particularly preferably 150 nm or more. The content of the second and third particles (fine particles) is 0.005 to 1% by weight, preferably 0.01 to 0.7% by weight, particularly preferably 0.05 to 0.5% by weight based on the thin film layer C.

The thermoplastic resin forming the thin film layer C may be the same as or different from the thermoplastic resin A forming the base layer A. It is preferably the same as the thermoplastic resin A. It is particularly preferable that the base layer A and the thin film layer C are formed of polyethylene terephthalate or polyethylene-2,6-naphthalene dicarboxylate. These polyesters preferably have an intrinsic viscosity, measured in o-chlorophenol at 35° C., of about 0.4 to 0.9.

The laminate film of the present invention preferably has an air leak index of 1 to 15 mmHg/hr owing to the presence of the above thin film layer C.

Since the laminate film of the present invention has the above thin film layer C and exhibits the above air leak index C, it can have improved handling properties and wind-up properties of a film without impairing electromagnetic conversion characteristics.

The total thickness of the laminate film of the present invention is generally 2.5 to 20 μm, preferably 3.0 to 10 μm, more preferably 4.0 to 10 μm. The thickness of the thin film layer C is ½ or less, preferably ⅓ or less, particularly preferably ¼ or less the total thickness of the laminate film. The thickness of the coating film layer B is 1 to 100 nm, preferably 2 to 50 nm, more preferably 3 to 10 nm, particularly preferably 3 to 8 nm.

The laminate film of the present invention can be produced by conventionally known methods or methods accumulated in the industry. Of these, a laminate structure comprising the base layer A and the thin film layer C is preferably produced by a coextrusion method, and the coating film layer B is preferably formed on the laminate structure by a coating.

In the case of a biaxially oriented polyester film, for example, polyester A comprising the inert fine particles A finely dispersed therein and polyester C comprising the inert fine particles C finely dispersed therein are filtrated with higher precision respectively and successively laminated together while they are molten within or before an extrusion die (the former is generally called "a multi-manifold system" and the latter "a feed block system") and to form a laminate structure having the above-described appropriate thickness ratio, and then the laminate structure is coextruded into a film from a die at a temperature of melting point Tm (°C.) to (Tm+70)° C. and quenched and solidified at 40 to 90° C. on a cooling roll to obtain an unstretched laminate film. Thereafter, the unstretched laminate film is stretched to 2.5 to 8.0 times, preferably 3.0 to 7.5 times in a uniaxial direction (in a longitudinal or transverse direction) at a temperature of (Tg−10) to (Tg+70)° C. (Tg: glass transition temperature of the polyester) and then to 2.5 to 8.0 times, preferably 3.0 to 7.5 times in a direction perpendicular to the above direction at a temperature of Tg to (Tg+70)° C. in accordance with a commonly used method. Further, the laminate film may be re-stretched in a longitudinal direction and/or transverse direction as required. That is, two-stage, three-stage, four-stage or multi-stage stretching may be carried out. The total stretch ratio is generally 9 times or more, preferably 12 to 35 times, more preferably 15 to 30 times in terms of area stretch ratio. Subsequently, the biaxially oriented film is heat-set at a temperature of (Tg+70) to (Tm−10)° C., for example, 180 to 250° C. to be crystallized so as to provide excellent dimensional stability. The heat-setting time is preferably 1 to 60 seconds.

In the above method, the above-described coating solution, preferably hydrophilic coating solution, containing the inert fine particles, binder resin, surfactant X and surfactant Y is applied. The coating solution is preferably applied to the surface of the polyester layer A before final stretching, and then, the film is stretched in at least one direction. The coating film is dried before or during this stretching. Coating is preferably carried out on an unstretched laminate film or longitudinally (uniaxially) stretched laminate film, particularly preferably longitudinally (uniaxially) stretched laminate film. Coating is not particularly limited and may be roll coating, die coating or the like.

The solid content of the above coating solution, particularly hydrophilic coating solution, is preferably 0.2 to 8% by weight, more preferably 0.3 to 6% by weight, particularly preferably 0.5 to 4% by weight. The coating solution (preferably hydrophilic coating solution) may contain other components such as other surfactant, stabilizer, dispersant, UV absorber, viscosity enhancer and the like to the limits that do not impair the effect of the present invention.

The above-described exemplification is suitable when the thermoplastic resin layer A and the thermoplastic resin of the thin film layer C are both polyethylene-2,6-naphthalene dicarboxylate or polyethylene terephthalate and it is also suitable when only the base layer A or only the thin film layer C is formed of polyethylene-2,6-naphthalene dicarboxylate or polyethylene terephthalate.

In the production of the laminate film, the thermoplastic resin may contain additives other than the above-described inert particles, such as a stabilizer, colorant, resistivity control agent for a molten polymer and the like as desired.

In the present invention, to improve various properties such as head touch and running durability of a magnetic recording medium and to reduce the thickness of the film, the Young's modulus in the longitudinal direction and the Young's modulus in transverse direction of the laminate film are respectively set to preferably not less than 450 kg/mm$^2$ and not less than 600 kg/mm$^2$, more preferably not less than 480 kg/mm$^2$ and not less than 680 kg/mm$^2$, particularly preferably not less than 550 kg/mm$^2$ and not less than 800 kg/mm$^2$, the most preferably not less than 550 kg/mm$^2$ and not less than 1,000 kg/mm$^2$. The crystallinity of the polyethylene terephthalate layer is desirably 30 to 50% and the crystallinity of the polyethylene-2,6-naphthalene dicarboxylate layer is desirably 28 to 38%. If the crystallinity falls below the lower limit, the thermal shrinkage factor will become large, while if the crystallinity exceeds the upper limit, the abrasion resistance of the film will deteriorate with the result that white powders are liable to be produced when the film runs when the film comes into contact with a roll or guide pin.

According to the present invention, there is also provided a magnetic recording medium comprising the laminate film of the present invention as a base film, that is, a magnetic recording medium comprising the laminate film of the present invention and a magnetic layer present on the coating film layer B of the laminate film.

The embodiments of production of the magnetic recording medium using the laminate film of the present invention are given as follows.

A deposited magnetic recording medium for high-density recording having excellent output at a short-wavelength range and excellent electromagnetic conversion characteristics such as S/N and C/N, few drop-outs and a small error rate can be achieved using the laminate film of the present invention by forming a thin film layer of ferromagnetic metal formed of iron, cobalt, chromium, an alloy thereof or an oxide thereof on the surface of the first film layer B by means of a vacuum vapor deposition, sputtering, ion plating or the like, and forming a protective layer comprising diamond-like carbon (DLC) or the like and a fluorine-containing carboxylic acid-based lubricating layer sequentially on the surface of the thin ferromagnetic metal film layer as required according to the purpose and application, and further a known back coat layer on the surface of the thin film layer C as required. This deposited magnetic recording medium is very useful as a magnetic recording tape for analog signal recording system, Hi8 video recorder and for digital recording system, for example, digital video cassette recorder (DVC), 8 mm data recorder and DDS4 data recorder.

A metal coated magnetic recording medium for high-density recording having excellent output at a short wavelength range and electromagnetic conversion characteristics such as S/N and C/N, few drop-outs and a small error rate can be produced from the laminate film of the present invention by uniformly dispersing needle-shaped fine magnetic powders (metal powders) of iron or containing iron as a main component into a binder solution as polyvinyl chloride, vinyl chloride-vinyl acetate copolymer and the like, and by applying the dispersion mixture onto the surface of the film layer B so as to make the thickness of a magnetic layer not larger than 1 $\mu$m, preferably 0.1 to 1 $\mu$m, and further forming a back coat layer on the surface of the thin film layer C by a known method, as required. If required, fine titanium oxide particles may be dispersed into the same organic binder solution as that for the magnetic layer and this dispersion mixture may be applied onto the surface of the base layer A to form a non-magnetic layer as a layer underlying the metal powder-containing magnetic layer as required. This metal coated magnetic recording medium is very useful as a magnetic recording tape for analog signal recording system, for example, 8 mm video, Hi8, β-cam SP and W-VHS and for digital recording system, for example, digital video cassette recorder (DVC), 8 mm data recorder and DDS4 data recorder, DLT data recorder and digital professional VTR, i.e., digital β-cam, D2, D3 and β-cam SX.

A coated magnetic recording medium for high-density recording having excellent output at a short wavelength range and electromagnetic conversion characteristics such as S/N and C/N, few drop-outs and a small error rate can be produced from the laminate film of the present invention by uniformly dispersing needle-shaped fine magnetic powders such as iron oxide or chromium oxide, or plate-like shaped fine magnetic powders such as barium ferrite into a binder such as polyvinyl chloride, vinyl chloride-vinyl acetate copolymer and the like, and by applying the dispersion mixture onto the surface of the film layer B so as to make the thickness of a magnetic layer not larger than 1 $\mu$m, preferably 0.1 to 1 $\mu$m, and further by forming a back coat layer on the surface of the thin film layer C by a known method as required. Titanium oxide fine particles may be dispersed into the same organic binder as that for the magnetic layer and this binder may be applied onto the surface of the thin film layer C to form a non-magnetic layer as a layer underlying the metal powder-containing magnetic layer as required. This oxide coated magnetic recording medium is useful as a magnetic recording tape for high density recording system, for example, DIT for data streamer.

The above-described W-VHS is a VTR for analog HTDV signal recording, and DVC can be used for digital HDTV signal recording. It can be said that the laminate film of the present invention is a base film extremely useful for a magnetic recording medium for the VTRs applicable to HDTV signals.

The following examples are given to further illustrate the present invention. Measurement methods used in the present invention are as follows.

(1) Intrinsic Viscosity

This is obtained from a value measured in an orthochlorophenol solvent at 35° C.

(2) Average Particle Diameter I of Particles (Average Particle Diameter: Not Smaller Than 0.06 $\mu$m)

This is measured using the CP-50 model Centrifugal Particle Size Analyzer of Shimadzu Corporation. A particle diameter, "equivalent spherical diameter" equivalent to 50 mass percent, is read from a cumulative curve of the particles of each diameter and the amount thereof calculated based on the obtained centrifugal sedimentation curve, and taken as the average particle diameter (refer to "Particle Size Measurement Technology" issued by Nikkan Kogyo Press, pp. 242–247, 1975).

(3) Average Particle Diameter II of Particles (Average Particle Diameter: Smaller Than 0.06 $\mu$m)

Particles having an average particle diameter smaller than 0.06 $\mu$m are measured by a light scattering method. That is, it is expressed by the "equivalent spherical diameter" of the particles which correspond to the particle size at a point of 50% by number of the total of all particles obtained by the NICOMP Model 270 Submicron Particle Sizer of Nicomp Instruments Inc.

(4) HLB Value

This is obtained from the following equation.

$$HLB = 20 \times Mn/M$$

wherein M is a molecular weight of a surfactant and Mn is a molecular weight of a hydrophilic group.

(Refer to "Oil Chemistry" Vol.13, pp.220, 1964.)

(5) Thicknesses of Thermoplastic Resin Layer A and Thin Film Layer C and the Total Thickness The thickness of a film is measured at 10 locations at random by a micrometer, and an average value of the measurement values is taken as the total thickness of the film. As for the thicknesses of the layer A and the thin film layer C, the thickness of a thin layer is measured by the following method while the thickness of a thick layer is obtained by subtracting the thickness of the thin layer and the thickness of the coating film layer from the total thickness. That is, using a secondary ion mass spectrometer (SIMS), the concentration ratio ($M^+/C^+$) of a metal element ($M^+$) present in particles having the highest concentration out of the particles contained in the film to the carbon element ($C^+$) of a polyester is taken as a particle concentration. This analysis is carried out in the range of from the surface layer excluding the coating layer up to a depth of 5,000 nm in the thickness direction of the film. In the vicinity of the surface of the layer, the particle concentration is measured to be low but becomes higher as the distance of the measured point from the surface increases. In the present invention, there are two cases: one case where after the particle concentration becomes a stable value 1, it increases to a stable value 2, and the other case where after the particle concentration becomes a stable value 1, it decreases continuously. Based on this distribution curve, in the former case, a depth which provides a particle concentration of (stable value 1+stable value 2)/2 is taken as the thickness of the layer whereas in the latter case, a depth that provides a particle concentration of one-half of the stable value 1 (deeper than the depth that gives a stable value 1) is taken as the thickness of the layer.

Measurement conditions are as follows.

(1) Measurement Instrument
  secondary ion mass spectrometer (SIMS): 6300 of PERKIN ELMER Co. Ltd.
(2) Measurement Conditions
  species of primary ion: $O_2+$
  acceleration voltage of primary ion: 12 kV
  primary ion current: 200 nA
  luster area: 400 $\mu$m□
  analysis area: gate 30%
  measurement degree of vacuum: $6.0 \times 10^{-9}$ Torr
  E-GUNN: 0.5 kV–3.0 A In the case where most of the particles contained in an area of from the surface layer to a depth of 5,000 nm are organic polymer particles other than a silicone resin, it is difficult to detect them with SIMS. Therefore, a concentration distribution curve similar to the above is measured by FT-IR (Fourier transformed infrared spectroscopy) or XPS (X-ray photo-electron spectroscopy) to obtain a thickness of the layer while the film is etched little by little from the surface.

(6) Density of Protrusions Produced by Inert Particles B on the Surface of Coating Film Layer B The density of protrusions on the surface of a film is measured by a scanning electron microscope. That is, 25 photos of the surface of the coating film layer B of a laminate film are taken at random at a magnification of 35,000× to count the number of surface protrusions, and the number of protrusions per $mm^2$ is calculated from an average value of the counts and taken as the density of protrusions produced by inert particles B on the surface of the coating film layer B.

(7) Density of Protrusions Produced by Inert Particles A on the Surface of Coating Film Layer B The density of protrusions on the surface of a film is measured by a scanning electron microscope. That is, 25 photos of the surface of the coating film layer B of a laminate film are taken at random at a magnification of 5,000× to count the number of surface protrusions, and the number of protrusions per $mm^2$ is calculated from an average value of the counts and taken as the density of protrusions produced by inert particles A on the surface of the coating film layer B.

(8) Center Plane Average Roughness WRa

Using a non-contact three-dimensional (3-D) roughness meter (TOPO-3D) of WYKO Co., Ltd., this is measured under conditions of a measurement magnification of 40× and a measurement area of 242 $\mu$m×239 $\mu$m (0.058 $mm^2$) to obtain a profile (original data) of the surface roughness. WRa is calculated from the following equation based on surface analysis using the built-in software of the roughness meter, and an output value is used.

$$WRa = \sum_{k=1}^{256}\sum_{j=1}^{256} |Z_{jk} - \bar{Z}|(M \cdot N)$$

$$\text{wherein } \bar{Z} = \sum_{k=1}^{256}\sum_{j=1}^{256} Z_{jk}/(M \cdot N)$$

$Z_{jk}$ is a height on a 3-D roughness chart at j-th in a measurement direction (242 $\mu$m) and k-th positions in a direction (239 $\mu$m) perpendicular to the measurement direction, both of which consist of 256 digital data, and so M and N are respectively 256.

(9) Number of High Peaks (A) Due to the Agglomeration of Particles in the Polymer Layer A Using the surface roughness profile (original data) obtained in (8) above, an average value of height in areas (15×15 sectional areas) formed by 15 continuous sections (for example, j=1 to 15) of a measurement direction and 15 continuous sections (for example, k=1 to 15) of a direction perpendicular to the measurement direction (perpendicular direction) of the profile is first obtained (If j=1 to 15, k=1 to 15, this average value is defined to be $\bar{z}_{8,8}$). Thereafter, the continuous sections of the measurement direction or the perpendicular direction is shifted to next 15 continuous sections, that is, j=2 to 16, k=1 to 15 or j=1 to 15, k=2 to 16, to obtain an average value of height in newly shifted 15×15 sections, and in this case, the average value is defined to be $\bar{z}_{9,8}$ or $\bar{z}_{8,9}$. In this way, the calculation of an average value of height in 15×15 sectional areas ($\bar{z}_{j,k}$) by successively shifting the continuous sections to next 15 continuous sections in the measurement direction ($\bar{z}_{j+1,k}$) or the perpendicular direction ($\bar{z}_{j,k+1}$) is repeated for each of 256 sections of the measurement direction and 256 sections of the perpendicular direction. The profile of surface roughness formed by thus obtained average values correspond to wavy surface components on the surface of the film.

The profile of the film surface is reformed (reformed data) by subtracting the wavy surface components from the original data ($Z_{jk}-\bar{z}_{jk}$ for j=8 to 249, k=8 to 249). This reformed data are analyzed by the built-in software of the roughness meter to count the number of peaks having a height of 4 nm or more as high peaks, and this measurement is repeated 10 times by changing the measurement location of the film, and a number of high peaks is a value obtained by converting an average value of the above measurement values into the number of peaks per $mm^2$ ($\bar{z}_{jk}$ for j=1 to 7, k=1 to 7, j=250 to 256, k=250 to 256, are neglected, because there are no data defined for these areas).

(10) Young's Modulus

Using the Tensilon tensile tester of Toyo Baldwin Co., a 300 mm long and 12.7 mm wide sample film is pulled at a strain rate of 10%/min in a room where the temperature is controlled to 20° C. and the humidity to 50% and Young's modulus of the sample film is calculated from the following equation using an initial straight line portion of a tensile stress-strain curve.

$$E = \Delta\sigma/\Delta\epsilon$$

wherein E is a Young's modulus ($kg/mm^2$), $\Delta\sigma$ is a stress difference between two points on a straight line produced by the original average cross section, and $\Delta\epsilon$ is a strain difference between the same two points.

(11) Air Leak Index

Using the Bekk tester of Toyo Seiki Co. Ltd, 40 films are stacked up, a 5 mm-diameter hole is formed through the stacked films excluding the uppermost film, and these 39 films having the hole is set on the sample stand in such a manner that a center portion of the hole is aligned with the center of the sample stand. In this state, a load of 0.5 kg/cm$^2$ is applied to the stacked-up films and the level of vacuum to be reached is set to 550 mmHg by a vacuum pump. After the level of vacuum reaches 550 mmHg, the vacuum pump is switched off and air flows through spaces between films to return to normal pressure. At this point, the vacuum level change (mmHg) is measured every 30 seconds for 1 hour and the inclination of a straight line (=mmHg/hr) is taken as an air leak index G when the the vacuum level change with respect to the measurement time (hr) is approximated to the straight line.

(12) Number of High Peaks (B) Due to the Agglomeration of Particles in the Coating Layer The surface of the coating film layer B is observed at a magnification of 400× by a differential interference method after depositing aluminum to a thickness of 0.5 μm using the OPTIPHOT optical microscope of Nikon Corporation to count the number of protrusions, the size of which is 2 μm or more in a longitudinal direction and 5 μm or more in a transverse direction, and the number is converted into a number per mm$^2$.

(13) Coating Failure and Coating Stripes

The film is immersed, with the coating film layer B facing downward, in a dye solution having the following composition (temperature of 50° C.) for 10 minutes, washed with water and then observed visually to check if there are elliptical or circular undyed areas that are taken as a coating failure, and undyed stripes in a longitudinal direction that are taken as coating stripes. The evaluation of the film is O when there is no coating failure and X when coating failure is present, and the coating stripes of the film is evaluated as O when there is no coating stripe and X when stripes are present.

| composition of dye solution | |
| --- | --- |
| methylene blue | 10 parts by weight |
| benzyl alcohol | 30 parts by weight |
| Kayakalan red | 2 parts by weight |
| rhodamine B | 2 parts by weight |
| ion exchange water | 1956 parts by weight |

(14) Production and Evaluation of Characteristics of Magnetic Tape

Two layers of 100% cobalt ferromagnetic thin film are formed on the surface of the coating film layer B of a biaxially oriented laminate film to allow the film layer B to have a total thickness of 0.2 μm (each layer has a thickness of about 0.1 μm) by a vacuum vapor deposition method. A diamond-like carbon (DLC) film layer and a fluorine-containing carboxylic acid-based lubricating layer are formed sequentially on top of the thin film layers, and a back coat layer is further formed on the surface of the thermoplastic resin C side by a known method. Thereafter, the resulting laminate film is slit into a 8 mm wide tape which is then loaded into a commercial available 8 mm video cassette. Then, the characteristics of this tape are measured using the following commercially available measurement instruments.

Instruments Used 8 mm video tape recorder: EDV-6000 of Sony Corporation

C/N measurement: noise meter of Shibasoku Co., Ltd.

(1) C/N Measurement

A signal having a recording wavelength of 0.5 μm (frequency of about 7.4 MHz) is recorded, the ratio of values at 6.4 MHz and 7.4 MHz of its reproduced signal is taken as the C/N of a tape, and C/N is evaluated based on the following criteria when the C/N of a deposited tape for a commercially available 8 mm video is 0 dB.

Criteria Standard

ⓞ: +5 dB or more as compared with commercial 8 mm tape

O: +1 dB or more but less than +5 dB as compared with commercial 8 mm tape

X: less than +1 dB as compared with commercial 8 mm tape (2) Drop-Out (D/O) Measurement Using the drop-out counter of Shibasoku Co., Ltd, the number of drop-outs of not less than 3 μsec/10 dB is measured for 10 minutes and the measurement value is converted to a number per minute.

O: 10 or less drop-outs per minute

X: 11 or more drop-outs per minute (3) Running Durability 4.2 MHz image signals are recorded on the above-described deposited tape and the tape is run at a running speed of 41 m/min, and a rewinding speed of 41 m/min under the conditions 25° C. and 50% RH and a variation of output is checked after running under the above conditions is repeated 200 times. The running durability is evaluated from the variation of output based on the following criteria.

ⓞ: The output variation is 0 to −0.3 dB, exclusive of −0.3 dB, after 200 times of running.

O: The output variation is −0.3 dB to −0.6 dB, exclusive of −0.6 dB, after 200 times of running.

X: The output variation is −0.6 dB or below after 200 times of running.

EXAMPLE 1

Dimethyl terephthalate and ethylene glycol were polymerized, by a commonly used method, by adding magnesium acetate as an ester exchange catalyst, titanium trimellitate as a polymerization catalyst, phosphorous acid as a stabilizer and inert particles shown in Table 1 as a lubricant to obtain polyethylene terephthalates (PET) and having an intrinsic viscosity of 0.60 for layer A (resin A) and layer C (resin C).

The resin A and the resin C were separately dried at 170° C. for 3 hours, supplied to two respective extruders, molten at a temperature of 280 to 300° C. and filtrated with high precision by a stainless steel wire filter having an average mesh opening of 11 μm. Using a multi-manifold coextrusion die, the resin layer C was laminated on one surface of the resin layer A and quenched to obtain a 136 μm-thick unstretched laminate film.

The obtained unstretched film was preheated, stretched to 3.3 times in a longitudinal direction at a film temperature of 100° C. between high-speed and low-speed rolls and quenched, and a hydrophilic coating solution (total solid content of 1.0% by weight) having a composition shown in Table 2 was coated onto the surface of the layer A side of the longitudinally stretched film by a kiss-roll coating. The coated film was supplied to a stenter and stretched to 4.2 times in a transverse direction at 110° C. The obtained biaxially oriented film was heat-set with hot air heated at 220° C. for 4 seconds to obtain a 9.8 μm-thick biaxially oriented laminate polyester film. The thicknesses of the layers A and C were adjusted by controlling the discharge of polymer to the two extruders. The film had a Young's modulus of 500 kg/mm$^2$ in the longitudinal direction and 700 kg/mm$^2$ in the transverse direction.

The surface properties of this laminate film and the characteristic properties of a ferromagnetic thin film deposited magnetic tape formed of this film are shown in Table 3.

EXAMPLE 2

A laminate film was obtained in the same manner as in Example 1 except that polyethylene terephthalate containing no inert particles and having an intrinsic viscosity of 0.60 was used as a thermoplastic resin for the layer A. The surface properties of this laminate film and the characteristic properties of a ferromagnetic thin film deposited magnetic tape formed of this film are shown in Table 3.

EXAMPLE 3

A 136 μm-thick unstretched film was obtained from polyethylene terephthalate containing no inert particles and having an intrinsic viscosity of 0.60 in the same manner as in Example 1.

The obtained unstretched film was preheated, stretched to 3.3 times in a longitudinal direction at a film temperature of 100° C. between low-speed and high-speed rolls and quenched, and a hydrophilic coating (B-1) having a composition shown in Table 2 was coated onto both surfaces of the longitudinally stretched film by a kiss-roll coating. The coated film was led to a stenter and stretched to 4.2 times in a transverse direction at 110° C. The obtained biaxially oriented film was heat-set with hot air heated at 220° C. for 4 seconds to obtain 9.8 μm-thick biaxially oriented laminate polyester film. The film had a Young's modulus of 500 kg/mm$^2$ in the longitudinal direction and 700 kg/mm$^2$ in the transverse direction.

The surface properties of this laminate film and the characteristic properties of a ferromagnetic thin film deposited magnetic tape formed of this film are shown in Table 3.

EXAMPLE 4

A laminate film was obtained in the same manner as in Example 3 except that a hydrophilic coating (B-1) having compositions shown in Table 2 and a hydrophilic coating (B-4) were applied to the respective surfaces of the longitudinally stretched film obtained in Example 3. The results are shown in Table 3.

EXAMPLE 5

A laminate film comprising a 9 μm-thick layer composed of polyethylene terephthalate containing no inert particles and having an intrinsic viscosity of 0.6 as a base layer and a 0.8 μm-thick layer composed of polyethylene terephthalate containing 0.1% by weight of silicone particles having an average particle diameter of 0.6 μm and 0.3% by weight of θ-alumina particles having an average particle diameter of 0.06 μm was obtained in the same manner as in Example 4. The coating film layer B was present on the layer containing no inert particles and the thin film layer C was present on the layer containing the inert particles. The results are shown in Table 3.

EXAMPLES 6 AND 7 AND COMPARATIVE EXAMPLES 1 to 3

Laminate films were obtained in the same manner as in Example 1 except that inert particles contained in the layers A and C and the thickness of each layer were changed as shown in Table 1 and the composition of the coating film layer B was changed as shown in Table 2. The characteristic properties of the obtained films and the characteristic properties of ferromagnetic thin film deposited magnetic tapes formed of the films are shown in Table 3.

EXAMPLES 8 TO 10 AND COMPARATIVE EXAMPLES 4 AND 5

Polyethylene-2,6-naphthalate (PEN) for the layer A (resin A) and layer C (resin C) were obtained in the same manner as in Example 1 except that the same molar amount of 2,6-naphthalene dimethyl dicarboxylate was used in place of dimethyl terephthalate and particles shown in Table 1 were used as the inert particles.

The resins A and C were dried at 170° C. for 6 hours and thicknesses thereof were adjusted in the same manner as in Example 1 to obtain unstretched laminate films of Examples 8 to 10 and Comparative Examples 4 and 5.

The thus obtained unstretched films were preheated, stretched to 3.3 times in a longitudinal direction for Example 8, 3.6 times for Example 9 and Comparative Examples 4 and 5 and 4.0 times for Example 10 between high-speed and low-speed rolls at a film temperature of 135° C., and quenched, and a hydrophilic coating solution for the coating film B shown in Table 2 was coated to the longitudinally stretched films in the same manner as in Example 1. Subsequently, the coated films were then led to a stenter and stretched to 6.4 times for Example 8, 5.6 times for Example 9 and Comparative Examples 4 and 5 and 5.2 times for Example 10 in a transverse direction at 155° C. The obtained biaxially oriented films were heat-set with hot air heated at 200° C. for 4 seconds to obtain laminate films.

The characteristic properties of the thus obtained films and the characteristic properties of ferromagnetic thin film deposited magnetic tapes formed of these films are shown in Table 3.

COMPARATIVE EXAMPLE 6

A laminate film was obtained in the same manner as in Example 1 except that the mesh opening of the steel wire filter used for high-precision filtration after the thermoplastic resin A was supplied to an extruder was changed to 4.8 μm. The characteristic properties of this laminate film and a ferromagnetic thin film deposited tape using this film are shown in Table 3. As is evident from Table 3, this film had a large number of high peaks (A) on the surface and therefore, a tape formed of the film had many drop-outs and worse running durability due to the partial abrasion of the head.

TABLE 1

| | Thermoplastic resin layer A | | | | | |
|---|---|---|---|---|---|---|
| | | | Inert particles A | | | |
| | Kind | Thickness (μm) | Kind | Average particle diameter (nm) | Volume shape factor | Content (wt %) |
| Ex. 1 | PET | 9 | Silica | 120 | 0.5 | 0.05 |
| Ex. 2 | PET | 9 | — | — | — | — |
| Ex. 3 | PET | 9 | — | — | — | — |
| Ex. 4 | PET | 9 | — | — | — | — |

TABLE 1-continued

| | | | | | | |
|---|---|---|---|---|---|---|
| Ex. 5 | PET | 9 | * | | | |
| Ex. 6 | PET | 5 | Silica | 85 | 0.5 | 0.02 |
| Ex. 7 | PET | 5 | Silica | 100 | 0.5 | 0.04 |
| Ex. 8 | PEN | 4 | Silicone | 45 | 0.4 | 0.03 |
| Ex. 9 | PEN | 3 | Silica | 65 | 0.4 | 0.02 |
| Ex. 10 | PEN | 4 | Acryl | 70 | 0.3 | 0.01 |
| Comp. Ex. 1 | PET | 5 | Silica | 65 | 0.4 | 0.02 |
| Comp. Ex. 2 | PET | 5 | Silica | 65 | 0.4 | 0.02 |
| Comp. Ex. 3 | PET | 5 | Silica | 65 | 0.4 | 0.02 |
| Comp. Ex. 4 | PEN | 4 | Kaolin | 120 | 0.05 | 0.07 |
| Comp. Ex. 5 | PEN | 3 | Silica | 65 | 0.4 | 0.02 |
| Comp. Ex. 6 | PET | 9 | Silica | 120 | 0.5 | 0.05 |

| | | Thin film layer C | | | | | | |
|---|---|---|---|---|---|---|---|---|
| | | Inert particles C | | Other particles | | | | |
| | Kind | Kind | Average particle diameter ($\mu$m) | Content (wt %) | Kind | Average particle diameter ($\mu$m) | Content (wt %) | Thickness (nm) | $(dc)^3 \times Cc \times tc$ |
| Ex. 1 | PET | Silicone | 0.6 | 0.1 | θ-alumina | 0.06 | 0.3 | 800 | 17.3 |
| Ex. 2 | PET | Silicone | 0.6 | 0.1 | θ-alumina | 0.06 | 0.3 | 800 | 17.3 |
| Ex. 3 | B1 | Acryl | 0.05 | 3 | — | — | — | 6 | 0.002 |
| Ex. 4 | B4 | Acryl | 0.05 | 10 | — | — | — | 6 | 0.008 |
| Ex. 5 | B1 | Acryl | 0.05 | 3 | — | — | — | 6 | 0.002 |
| Ex. 6 | PET | Silicone | 0.6 | 0.1 | θ-alumina | 0.06 | 0.3 | 1400 | 30.2 |
| Ex. 7 | PET | Silicone | 0.6 | 0.1 | Silica | 0.12 | 0.4 | 1400 | 30.2 |
| Ex. 8 | PEN | Silica | 0.4 | 0.1 | θ-alumina | 0.08 | 0.2 | 2400 | 15.4 |
| Ex. 9 | PEN | Silica | 0.4 | 0.01 | θ-alumina | 0.08 | 0.3 | 800 | 0.5 |
| Ex. 10 | PEN | Silica | 0.7 | 0.05 | Silica | 0.16 | 0.3 | 600 | 10.3 |
| Comp. Ex. 1 | PET | Silicone | 0.6 | 0.1 | θ-alumina | 0.06 | 0.3 | 1400 | 30.2 |
| Comp. Ex. 2 | PET | Silicone | 0.6 | 0.1 | θ-alumina | 0.06 | 0.3 | 1400 | 30.2 |
| Comp. Ex. 3 | PET | Silicone | 0.6 | 0.1 | Silica | 0.12 | 0.4 | 1400 | 30.2 |
| Comp. Ex. 4 | PEN | Silicone | 0.6 | 0.1 | Silica | 0.12 | 0.3 | 600 | 13.0 |
| Comp. Ex. 5 | PEN | Silicone | 0.4 | 0.01 | θ-alumina | 0.08 | 0.3 | 800 | 0.5 |
| Comp. Ex. 6 | PET | Silicone | 0.6 | 0.1 | θ-alumina | 0.06 | 0.3 | 800 | 17.3 |

Ex.: Example
Comp. Ex.: Comparative Example
*: See the description of Example 5

TABLE 2

| | Coating film layer B | | | | | | | | | |
|---|---|---|---|---|---|---|---|---|---|---|
| | Binder | Inert particles B | | | Surfactant X | | | Surfactant Y | | |
| | Kind of resin | Kind | Average particle diameter (nm) | Content (wt %) | Kind | HLB | Content (wt %) | Kind | HLB | Content (wt %) | Average HLB |
| Ex. 1 | B-1 | Acryl | 50 | 3 | SAA1 | 12.6 | 1 | SAA4 | 17.8 | 15 | 17.5 |
| Ex. 2 | B-1 | Acryl | 50 | 3 | SAA1 | 12.6 | 1 | SAA4 | 17.8 | 15 | 17.5 |
| Ex. 3 | B-1 | Acryl | 50 | 3 | SAA1 | 12.6 | 1 | SAA4 | 17.8 | 15 | 17.5 |
| Ex. 4 | B-1 | Acryl | 50 | 3 | SAA1 | 12.6 | 1 | SAA4 | 17.8 | 15 | 17.5 |
| Ex. 5 | B-1 | Acryl | 50 | 3 | SAA1 | 12.6 | 1 | SAA4 | 17.8 | 15 | 17.5 |
| Ex. 6 | B-1 | Acryl | 40 | 10 | SAA2 | 12.8 | 2 | SAA4 | 17.8 | 23 | 17.4 |
| Ex. 7 | B-2 | Organic core-shell | 30 | 20 | SAA1 | 12.6 | 4 | SAA4 | 17.8 | 16 | 16.8 |
| Ex. 8 | B-3 | Acryl | 30 | 9 | SAA1 | 12.6 | 12 | SAA4 | 17.8 | 12 | 16.2 |
| Ex. 9 | B-1 | Organic core-shell | 30 | 5 | SAA2 | 12.8 | 0.5 | SAA4 | 17.8 | 36 | 17.7 |
| Ex. 10 | B-3 | Organic core-shell | 20 | 15 | SAA3 | 13.1 | 1 | SAA5 | 17.2 | 20 | 17.0 |
| Comp. Ex. 1 | B-1 | Acryl | 40 | 10 | — | — | — | SAA4 | 17.8 | 29 | 17.8 |
| Comp. Ex. 2 | B-1 | Organic core-shell | 30 | 10 | SAA1 | 12.6 | 20 | SAA4 | 17.8 | 29 | 15.7 |
| Comp. Ex. 3 | B-1 | Organic core-shell | 30 | 10 | SAA1 | 12.6 | 14 | SAA4 | 17.8 | 11 | 14.9 |
| Comp. Ex. 4 | B-1 | Organic core-shell | 30 | 10 | SAA1 | 12.6 | 4 | SAA5 | 17.2 | 50 | 16.9 |

TABLE 2-continued

| | | Coating film layer B | | | | | | | | |
|---|---|---|---|---|---|---|---|---|---|---|
| | Binder | Inert particles B | | | | Surfactant X | | Surfactant Y | | |
| | Kind of resin | Kind | Average particle diameter (nm) | Content (wt %) | Kind | HLB | Content (wt %) | Kind | HLB | Content (wt %) | Average HLB |
| Comp. Ex. 5 | B-1 | Organic core-shell | 30 | 10 | SAA1 | 12.6 | 2 | SAA6 | 18.7 | 25 | 18.2 |
| Comp. Ex. 6 | B-1 | Acryl | 50 | 3 | SAA1 | 12.6 | 1 | SAA4 | 17.8 | 15 | 17.5 |

Ex.: Example,
Comp. Ex.: Comparative Example

In the Tables 1 and 2,

Kind of Binder

B-1: Acryl modified polyester (IN-170-6 of Takamatsu Yushi K.K.)

B-2: Water-soluble (hydrophilic) polyester (RZ-530 of Gooh Kagaku K.K.)

B-3: Water-dispersible polyester (2,6-naphthalenedicarboxylic acid/isophthalic acid/5-sodium isophthalic acid//ethylene glycol/addition product of bisphenol A with propylene oxide=90/5/5//70/30)

B-4: Acryl-modified polyester SH551BK of Takamatsu Yushi K.K.)//methyl cellulose (SM-15 of Shin-Etsu Chemical Co., Ltd)=75//25)

Kind of Surfactant

SAA1: Nonin NS-208.5 of NOF Corporation

SAA2: Nonipole Soft SS-70 of Sanyo Chemical Industries, Ltd.

SAA3: Nonion L-4 of NOF Corporation

SAA4: Nonion NS-240 of NOF Corporation

SAA5: Nonion NS-230 of NOF Corporation

SAA6: Nonipole 700 of Sanyo Chemical Industries, Ltd.

TABLE 3

| | Film strength Young's modulus MD/TD (kg/mm$^2$) | Density of surface protrusions on surface of coating film layer B | | Surface roughness of coating film layer B (nm) | Air leak index (mmHG/hr) | Number of high peaks (A) (per mm$^2$) | Number of high peaks (B) (per mm$^2$) |
|---|---|---|---|---|---|---|---|
| | | Produced by inert particles A (per mm$^2$) | Produced by inert particles B (per mm$^2$) | | | | |
| Ex. 1 | 500/700 | 25,000 | 3,300,000 | 1.1 | 12 | 52 | 1 |
| Ex. 2 | 500/700 | 0 | 3,300,000 | 1.1 | 2 | 3 | 3 |
| Ex. 3 | 500/700 | 0 | 3,300,000 | 1.1 | 2 | 3 | 3 |
| Ex. 4 | 500/700 | 0 | 3,300,000 | 1.1 | 2 | 3 | 3 |
| Ex. 5 | 500/700 | 0 | 3,300,000 | 1.1 | 2 | 3 | 3 |
| Ex. 6 | 500/700 | 17,000 | 11,000,000 | 1.3 | 10 | 19 | 0 |
| Ex. 7 | 550/600 | 24,000 | 21,500,000 | 1.4 | 13 | 28 | 2 |
| Ex. 8 | 550/1450 | 45,000 | 9,500,000 | 1.3 | 8 | 10 | 2 |
| Ex. 9 | 570/1150 | 18,000 | 5,400,000 | 0.6 | 6 | 13 | 0 |
| Ex. 10 | 600/900 | 8,000 | 32,500,000 | 0.8 | 14 | 10 | 0 |
| Comp. Ex. 1 | 500/700 | 18,000 | 10,700,000 | 1.2 | 9 | 11 | 2 |
| Comp. Ex. 2 | 500/700 | 18,000 | 10,300,000 | 1.2 | 9 | 17 | 0 |
| Comp. Ex. 3 | 500/700 | 18,000 | 9,700,000 | 1.2 | 10 | 8 | 45 |
| Comp. Ex. 4 | 570/1150 | 20,000 | 10,400,000 | 1 | 8 | 46 | 2 |
| Comp. Ex. 5 | 570/1150 | 18,000 | 11,000,000 | 0.6 | 5 | 12 | 1 |
| Comp. Ex. 6 | 500/700 | 25,000 | 3,300,000 | 1.1 | 12 | 368 | 1 |

| | Coating failure | Coating stripes | Electromagnetic conversion characteristics | Drop-out | Running durability |
|---|---|---|---|---|---|
| Ex. 1 | ○ | ○ | ○ | ○ | ○ |
| Ex. 2 | ○ | ○ | ◎ | ○ | ○ |
| Ex. 3 | ○ | ○ | ◎ | ○ | ○ |
| Ex. 4 | ○ | ○ | ◎ | ○ | ○ |
| Ex. 5 | ○ | ○ | ◎ | ○ | ○ |
| Ex. 6 | ○ | ○ | ○ | ○ | ○ |
| Ex. 7 | ○ | ○ | ○ | ○ | ◎ |
| Ex. 8 | ○ | ○ | ◎ | ○ | ○ |
| Ex. 9 | ○ | ○ | ◎ | ○ | ○ |
| Ex. 10 | ○ | ○ | ○ | ○ | ○ |
| Comp. Ex. 1 | X | ○ | ○ | ○ | ○ |
| Comp. Ex. 2 | ○ | X | ○ | ○ | ○ |

TABLE 3-continued

| | | | | | |
|---|---|---|---|---|---|
| Comp. Ex. 3 | ○ | ○ | ○ | X | ○ |
| Comp. Ex. 4 | ○ | X | ○ | ○ | X |
| Comp. Ex. 5 | X | ○ | ○ | ○ | ○ |
| Comp. Ex. 6 | ○ | ○ | ○ | X | X |

Ex.: Example,
Comp. Ex.: Comparative Example

As is evident from Table 3, the laminate films of Examples exhibit excellent electromagnetic conversion characteristics, have an extremely small number of high peaks (B) which cause drop-outs and are almost free from such defects as a coating failure and coating stripes. Further, the laminate films of Examples have few drop-outs and excellent running durability due to appropriate inert particles contained in the layer A of a magnetic layer side and a small number of high peaks (A). On the other hand, films of Comparative Examples do not fulfill these requirements at the same time.

According to the present invention, it is possible to provide a laminate film which makes it possible to produce a magnetic recording medium having excellent running durability and electromagnetic conversion characteristics and almost free from drop-outs when it is used as a deposited thin metal film magnetic recording medium by greatly reducing the number of high peaks which cause drop-outs due to a coating solution for forming a coating film layer and by controlling the dispersibility of particles in the base film.

What is claimed is:

1. A laminate film comprising a base layer A formed of a thermoplastic resin A and a coating film layer B present on one surface of the base layer A, the coating film layer B containing a binder resin, inert fine particles and a surfactant, and said surfactant consisting essentially of 0.1 to 15% by weight of a surfactant X having an HLB value of 10 to 14 and 10 to 40% by weight of a surfactant Y having an HLB value of 16 to 18.5 based on the solid content of the coating film layer B to ensure that the average HLB value defined by the following equation be 15 to 18:

$$\text{average } HLB = HLB(X) \times (P)X + HLB(Y) \times P(Y)$$

wherein HLB(X) is an HLB value of the surfactant X, P(X) is a weight fraction of the surfactant X with respect to the total weight of the surfactants X and Y, HLB(Y) is an HLB value of the surfactant Y, and P(Y) is a weight fraction of the surfactant Y with respect to the total weight of the surfactants X and Y.

2. The laminate film of claim 1, wherein the thermoplastic resin A forming the base layer A does not substantially contain inert fine particles.

3. The laminate film of claim 1, wherein the thermoplastic resin A forming the base layer A contains inert fine particles A having an average particle diameter of 40 to 400 nm and a volume shape factor of 0.1 to $\pi/6$.

4. The laminate film of claim 1, wherein inert particles A are contained in the thermoplastic resin A in such a proportion that protrusions due to the inert particles A are present on the surface of the coating film layer B, which is not in contact with the base film layer A, at a density of 5,000 to 100,000 per $mm^2$.

5. The laminate film of claim 1, wherein protrusions due to inert fine particles contained in the coating film layer B are present on the surface of the coating film layer B, which is not in contact with the base film layer A, at a density of 1 to 40 per $\mu m^2$.

6. The laminate film of claim 1, wherein the inert fine particles contained in the coating film layer B have an average particle diameter of 10 to 50 nm and are contained in an amount of 0.5 to 30% by weight based on the solid content of the coating film layer B.

7. The laminate film of claim 1, wherein the coating film layer B has high peaks having a height, calculated from a surface roughness profile obtained by a non-contact 3-D roughness meter, of not less than 4 nm on the surface not in contact with the base layer A at a maximum density of 200 per $mm^2$.

8. The laminate film of claim 1, wherein the HLB value of the surfactant X is 10.5 to 13.5.

9. The laminate film of claim 1, wherein the surfactant X is contained in an amount of 0.65 to 10% by weight based on the solid content of the coating film layer B.

10. The laminate film of claim 1, wherein the HLB value of the surfactant Y is 16.5 to 18.3.

11. The laminate film of claim 1, wherein the surfactant Y is contained in an amount of 12 to 36% by weight based on the solid content of the coating film layer B.

12. The laminate film of claim 1, wherein the surfactants X and Y are contained in the proportion that an average HLB value should be 15.5 to 17.5.

13. The laminate film of claim 1, wherein the surfactants X and Y are nonionic surfactants.

14. The laminate film of claim 1, wherein the binder resin contained in the coating film layer B is a hydrophilic polyester resin.

15. The laminate film of claim 1, wherein a thin film layer C is further present on the surface not in contact with the coating film layer B, of the base layer A.

16. The laminate film of claim 15, wherein the thin film layer C is a coating film layer containing a binder resin, inert fine particles and a surfactant.

17. The laminate film of claim 15, wherein the thin film layer C has the same composition as the coating film layer B.

18. The laminate film of claim 15, wherein the thin film layer C comprises a thermoplastic resin layer containing inert fine particles C and formed by coextrusion with the base layer A.

19. The laminate film of claim 18, wherein the thin film layer C satisfies the following expression:

$$0.001 \leq (dc)^3 \times Cc \times tc \leq 100$$

wherein dc ($\mu m$) is an average particle diameter of the inert fine particles C, Cc (% by weight) is a content of the inert fine particles C and tc (nm) is a thickness of the thin film layer C.

20. The laminate film of claim 15 or 18 which has an air leak index of 1 to 15 mmHg/hr.

21. A magnetic recording medium comprising the laminate film of claim 1 and a magnetic layer present on the coating film layer B of the laminate film.

22. The magnetic recording medium of claim 21 which is used for Hi8 for analog signal recording, and for digital video cassette recorders, data 8 mm and DDSIV for digital signal recording.

23. Use of the laminate film of claim 1 as a base film for a magnetic recording medium.

* * * * *